(12) United States Patent
Boyer et al.

(10) Patent No.: US 8,475,728 B2
(45) Date of Patent: Jul. 2, 2013

(54) DEVICE FOR MIXING GAS AND FOR DISTRIBUTING THE RESULTING MIXTURE TO THE INLET OF A CATALYTIC REACTOR

(75) Inventors: Christophe Boyer, Charly (FR); Andre Nicolle, Puteaux (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 315 days.

(21) Appl. No.: 12/839,472

(22) Filed: Jul. 20, 2010

(65) Prior Publication Data

US 2011/0017326 A1    Jan. 27, 2011

(51) Int. Cl.
  *B01J 19/26* (2006.01)
  *B01J 4/00* (2006.01)
  *B01J 8/02* (2006.01)

(52) U.S. Cl.
  USPC .......................... 422/220; 422/224; 422/628

(58) Field of Classification Search
  USPC .......................................... 422/220, 224, 628
  See application file for complete search history.

(56) References Cited

U.S. PATENT DOCUMENTS

| 4,865,820 | A | * | 9/1989 | Dunster et al. | 422/220 |
| 5,106,590 | A | * | 4/1992 | Hopper et al. | 422/198 |

| 2001/0055548 | A1 | 12/2001 | Harter et al. |
| 2002/0021991 | A1 | 2/2002 | Boyer et al. |
| 2002/0142199 | A1 | 10/2002 | Goebel |
| 2006/0201065 | A1 | 9/2006 | Lucas et al. |
| 2008/0244974 | A1 | 10/2008 | Bartolini et al. |

FOREIGN PATENT DOCUMENTS

| EP | 1 147 809 | 10/2001 |
| EP | 1 180 393 | 2/2002 |
| WO | WO 2007045457 A1 * | 4/2007 |

OTHER PUBLICATIONS

International Search Report for FR-0903588 dated May 12, 2010.

\* cited by examiner

*Primary Examiner* — Jennifer A Leung
(74) *Attorney, Agent, or Firm* — Millen, White, Zelano & Branigan, P.C.

(57) ABSTRACT

A device for mixing and distributing two gases upstream of the catalytic zone of a reactor by producing a homogeneous mixture and a profile of velocities which are as flat as possible. The device uses a plurality of internal chambers (I) enclosed in an external chamber (II), the external chamber communicating with each of the internal chambers via orifices pierced in the wall of said internal chambers (I) at a well-defined height. The external chamber (II) is provided with a perforated plate placed at a distance H2 from the inlet pipe for said chamber (II). The device is applied to the inlet of an autothermal reactor.

8 Claims, 3 Drawing Sheets

DEVICE FOR MIXING GAS AND FOR DISTRIBUTING THE RESULTING MIXTURE TO THE INLET OF A CATALYTIC REACTOR

FIELD OF THE INVENTION

The field of the present invention is that of devices that can rapidly and homogeneously mix gases that have to react in a catalytic reaction zone located downstream of said device. In the context of the reactions concerned by the present invention, one of the gases is termed the reagent 1 and the other gas is termed reagent 2.

Reagent 1 is generally a vaporized hydrocarbon feed, possibly mixed with steam, and reagent 2 may be pure or mixed hydrogen, air, oxygen, or any mixture of air and oxygen in any proportions.

Reagent 2 may also contain a certain proportion of steam.

The present device is applicable to the inlet to any catalytic reactor with a diameter in the range 0.05 to 10 meters, and preferably in the range 0.1 to 5 meters.

The problem to be overcome by the present device is the rapid production of a homogeneous mixture of reagents 1 and 2, and a homogeneous distribution of the gas flow resulting from said mixing over the entire inlet section to the catalytic zone located downstream of the present mixing and distributing device.

Further, mixing the reagents must be as homogeneous as possible in that it must have a composition of reagent 1 and reagent 2 that is substantially identical at any point of the inlet section for the catalytic zone.

Finally, the mixture must also be homogeneous as regards the distribution of velocities, i.e. the profile of the radial velocity must be as flat as possible at the inlet to the catalytic reactor.

EXAMINATION OF THE PRIOR ART

U.S. Pat. No. 4,865,820 describes a device for mixing gas, consisting of a plurality of tubes terminating in enlarged conical sections. The principal gas is injected into the axis of the tubes and the secondary gas is introduced radially with respect to the tubes through orifices pierced in the wall of the tubes. The system can distribute the mixture of the principal gas and secondary gas properly provided that the enlarged conical ends cover substantially the whole section of the reactor. Enlarging the outlet section of the tubes (and thus the inlet into the catalytic zone) is aimed at reducing the velocity of the gaseous mixture and of avoiding vortex formation. In the cited patent, no device has been described for ensuring the distribution of the secondary gas stream upstream of the tube introduction orifices.

Patent US 2002/0142199 describes a system for mixing gas, including a plurality of tubes passing through a perforated plate. The first gas is injected through the tube and the second gas is injected through the orifices into an annular zone included between the tubes and the plate.

The gases are principally mixed by molecular diffusion between the two adjacent streams. For this reason, the distance necessary for producing a good mixture may be relatively large.

The device of the present invention means that a zone can be provided which is termed the mixing zone, which is fed in a homogeneous manner, said zone being a high turbulence zone, followed in some cases by a zone termed a distribution zone, which can slow down the mean velocity of the gas and allow entry into the catalytic zone of the reactor with a virtually flat profile of velocities with very good homogeneity of the gaseous mixture.

BRIEF DESCRIPTION OF THE INVENTION

Figure 1:
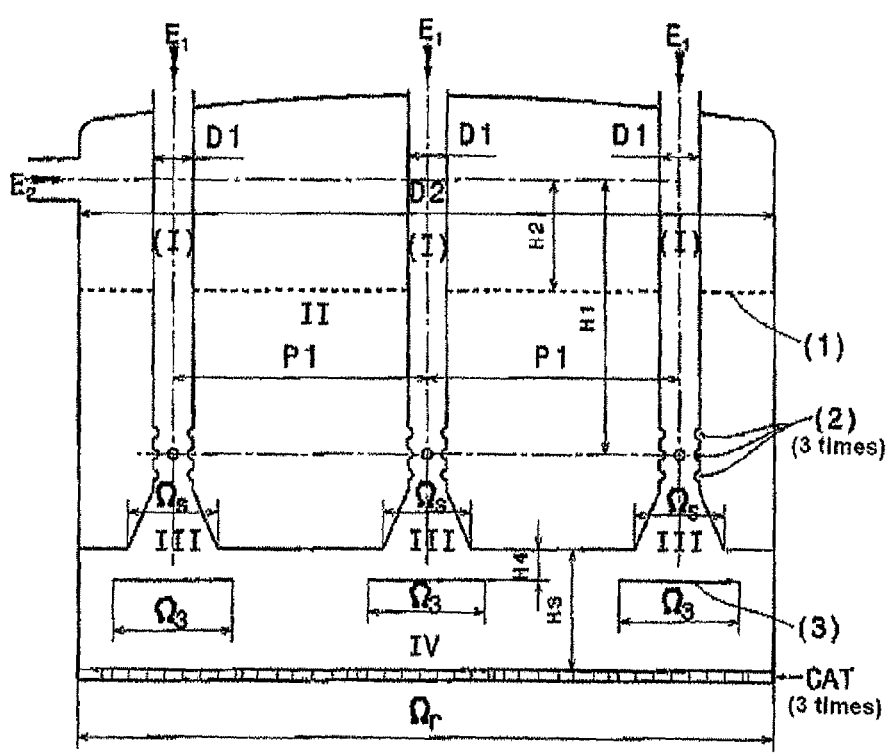
FIG. 1 shows a diagrammatic view of the device of the invention with its principal dimensions in the case in which the plurality of internal chambers I is enclosed in an external chamber II which is common to the set of internal chambers I.

The device of the present invention can be defined as a device for mixing and distributing a first gas (or reagent 1) and a second gas (or reagent 2) located upstream of a catalytic zone, the two gases constituting the reagents.

The device is constituted by a plurality of internal chambers I with diameter D1, an external chamber II with diameter D2, each internal chamber I having an enlarged lower zone with an outlet section $\Omega s$, and in some cases a distribution zone IV, common to the set of chambers I and interposed between the outlet sections $\Omega s$ of the internal chambers I and the inlet section $\Omega r$ of the catalytic zone.

When it exists, the distribution zone IV contains elements termed jet breakers, which are constituted by a solid plate positioned in a substantially horizontal manner, at right angles to each outlet section $\Omega s$ of the internal chambers I at a height H4 from said outlet section.

Each internal chamber I is provided with an inlet pipe E1 allowing the ingress of reagent 1, and the external chamber II is provided with an inlet pipe E2 allowing ingress of reagent 2 and disposed in the upper portion of the external chamber II.

The external chamber II is provided with a perforated plate 1 positioned at a distance H2 with respect to the inlet pipe E2.

The device may thus be viewed as an improvement to the injector concept described in U.S. Pat. No. 4,865,820 which is aimed at optimizing the homogeneity of supply from the mixing chamber and then the distribution of the stream resulting from said mixing.

Chamber II communicates with each of the chambers I via a series of orifices 2 pierced in the wall of each internal chamber I.

Each internal chamber I has an enlarged outlet end with a diameter Ds and outlet section $\Omega s$.

Two cases may be distinguished:
a) either the sum of the outlet sections $\Omega s$ of chambers I is equal to the section of the catalytic zone $\Omega r$, plus or minus about 10%, and then said outlet sections communicate directly with the catalytic zone;
b) or the sum of the outlet sections $\Omega s$ of the chambers I is strictly smaller than $\Omega r$, and then a zone IV is provided between the outlet section of each internal chamber I and the inlet section $\Omega r$ of the catalytic zone, zone IV being termed the distribution zone, said zone IV having a height H3 in the range 2D1 to 50 D1, and preferably in the range 2 D1 to 30 D1, and comprising a plurality of jet breakers positioned at right angles to each outlet section $\Omega s$, at a height H4 with respect to said outlet sections.

The enlarged zone III of each internal chamber I extends from the portion of the internal chamber I pierced with orifices 2 to the outlet end Ωs thereof. It has conical walls making an angle α with respect to the vertical.

The device of the invention is thus constituted by a plurality of internal chambers I, by the external chamber II which is common to the plurality of internal chambers I, by the enlarged zone III of each internal chamber I with an outlet section Ωs, and depending on the sum of the outlet sections Ωs with respect to the inlet section of the catalytic zone Ωr, by a distribution zone IV, provided with a plurality of jet breakers having a diameter $Ω_3$ located at right angles to each of the outlet sections Ωs.

The device of the invention also has the following features:
- a height H2 in the range 20 to 300 mm, preferably in the range 50 to 150 mm;
- an enlarged zone III on each of the internal chambers I having a conical shape that widens in the direction of reagent flow, the angle α of the walls of said mixing zone with respect to the vertical being in the range 5° to 45°, and preferably in the range 7° to 25°;
- a ratio of the sum of the outlet sections Ωs of the internal chambers I to the inlet section of the catalytic zone Ωr in the range 0.1 to 1, and preferably in the range 0.3 to 1.

In a variation of the device of the invention, the jet breakers provided in the distribution zone IV, when it exists, are positioned at a distance 114 with respect to the outlet sections of each internal chamber I such that H4 is in the range D1/4 to 2 D1.

In a preferred variation of the device of the invention, the perforated plate 1 provided in the external chamber II has a degree of opening in the range 5% to 50%, and preferably in the range 10% to 30%. The degree of opening is defined as the ratio of the open surface to the geometric section of the plate.

The pitch of the distance between the orifices of the perforated plate 1 is preferably in the range D'/3 to D'/10, wherein D' is defined as the difference between the pitch of the distance separating the internal chambers I and the diameter D1 of said internal chambers I.

The density of the internal chambers I is in the range 10 to 500 per $m^2$ of external chamber section II, preferably in the range 20 to 100 per $m^2$ of external chamber section II.

In another particular variation of the device of the invention, the plurality of internal chambers I is reduced to a single one and in this case, the pitch of the distance between the orifices of the perforated plate 1 is less than D/3, and preferably less than D/10, D denoting the difference between the diameter D2 of the external chamber II and the diameter D1 of the internal chamber I.

In one of its applications, the invention concerns the process for autothermal steam reforming of hydrocarbon cuts using the device of the invention, in which the fuel gas is constituted by the hydrocarbon cut and steam and the oxidant gas is constituted by air and steam. The hydrocarbon cut may be any mixture of hydrocarbons from various chemical families (paraffins, olefins, aromatics) with a number of carbon atoms which can be from 1 to 20, preferably in the range 1 to 10.

DETAILED DESCRIPTION OF THE INVENTION

The invention consists of a device for mixing and distributing two gaseous reagents denoted reagent 1 and reagent 2, with a view to supplying a catalytic zone located downstream of said device. The device is located upstream of the catalytic zone of the reactor, and can deliver to said catalytic zone a homogeneous gaseous mixture having a radial distribution of velocities that is as uniform as possible.

The term "radial distribution of velocities" means the profile of the velocities of the gas along any diameter of the reactor inlet section.

It is essential for certain types of reactions, in particular for combustion reactions, that the gaseous mixture is as homogeneous as possible at the inlet to the catalytic zone, as any degree of heterogeneity may result in the formation of a hot spot or, more generally, a thermal imbalance in said catalytic zone.

The gases to be mixed may be differentiated into a first gas, termed reagent 1, constituting the feed which may also contain steam, and a second gas, termed reagent 2, generally containing oxygen and steam, possibly nitrogen and $CO_2$, or other inert gases.

Figure 2:
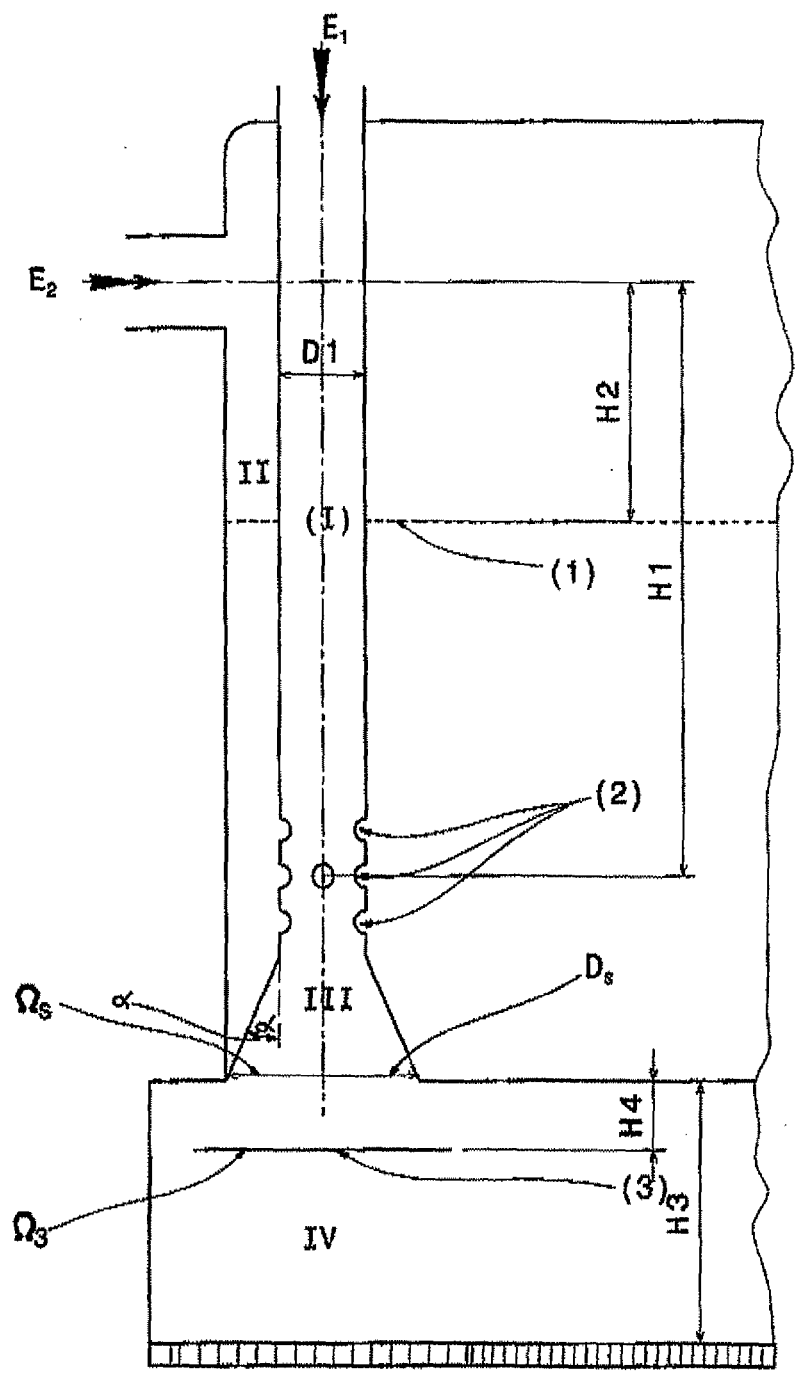
FIG. 2 shows a diagrammatic view of an internal chamber I in accordance with the invention.

The remainder of the description is made with reference to FIGS. 1 and 2.

The device of the present invention is composed of two chambers, a plurality of chambers I for introducing reagent 1, termed internal chambers I, the other being unique, for introducing reagent 2, termed the external chamber II. The plurality of internal chambers I which are substantially cylindrical is surrounded by the external chamber II, which is also substantially cylindrical.

Each of the internal chambers I has an inlet denoted E1. The external chamber E2 has an inlet E2 placed in the upper portion of the external chamber II.

The plurality of internal chambers I is placed in communication with the external chamber II via a set of orifices 2 pierced in the wall of the internal chambers I at a distance H1 with respect to the inlet pipe E2 which is substantially equal to twice the distance H2 separating the inlet pipe E2 from the perforated plate 1.

The reagent 2 introduced via the inlet E2 of the external chamber II passes into the internal chambers I through the orifices 2.

Each internal chamber I has, in its lower portion and up to its outlet end, a conical enlargement terminating in the outlet section Ωs. This enlargement is denoted zone III in FIGS. 1 and 2.

The pitch of the distance between the orifices of the perforated plate 1 is preferably in the range D'/3 to D'/10, wherein D' is defined as the difference between the pitch of the distance separating the internal chambers I and the diameter D1 of the internal chambers I.

The ratio of the outlet section Ωs of each internal chamber I to the inlet section Ωr of the catalytic zone is generally in the range 0.1 to 1, and preferably in the range 0.3 to 1.

The invention can in this case be differentiated into two cases:
- either the inlet section of the catalytic zone Ωr is equal to the sum of the outlet sections Ωs of each of the internal chambers I, plus or minus about 10%, and then the set of said outlet sections Ωs opens directly into the catalytic zone;
- or the inlet section of the catalytic zone Ωr is strictly greater (i.e. by more than 10%) than the sum of the outlet sections of the internal chambers I, and then the present device envisages interposing, between the outlet sections Ωs of each internal chamber I and the catalytic zone, a distribution chamber IV with the same section as the catalytic zone, and provided with a plurality of jet breakers 3 placed at right angles to each outlet section Ωs at a distance H4 from said outlet sections equal to D2/5.

The external chamber II is provided with a perforated plate 1 positioned at a distance H2 with respect to the inlet pipe E2, H2 being in the range 20 to 300 mm, preferably in the range 50 to 150 mm.

The perforated plate 1 has a degree of opening in the range 5% to 50%, preferably in the range 10% to 30%.

The pitch between the orifices of the perforated plate 1 is then preferably in the range D'/3 to D'/10, with D' being defined as the difference between the pitch of the distance separating the internal chambers I and the outer diameter D1 of said internal chambers I.

In accordance with a variation of the device of the invention, the jet breakers provided in the distribution zone IV, when it exists, are positioned at a distance H4 with respect to the outlet sections of each internal chamber I, such that H4 is in the range D1/4 to 2 D1.

Each jet breaker 3 is generally constituted by a solid plate placed substantially perpendicular to the direction of flow of the gases leaving each internal chamber I.

The jet breaker 3 essentially acts to dissipate the kinetic energy of the gaseous mixture issuing from each internal chamber I.

The present device is intended to be applied to reactors with a diameter which may be from 0.1 m up to 5 meters.

When the diameter of the reactor is less than 0.3 m, the plurality of internal chambers I is reduced to a single internal chamber I.

EXAMPLE OF THE INVENTION

The example consists of an autothermal reactor processing a feed constituted by C4/C5 hydrocarbons (reagent 1) and steam and using an oxidant gas (reagent 2) constituted by a mixture of oxygen and steam.

Table 1 below provides the flow rates, compositions and temperature of each of the two gases. The device was constituted by an external chamber II and 7 internal chambers I disposed in a triangular pattern completed by a distribution chamber IV provided with jet breakers 3 located facing the outlet section $\Omega s$ of the internal chambers I.

The device had the following dimensions relative to the diameter D1 of the internal chambers I:
diameter of internal chamber I: D1
diameter of external chamber II: 18 D1
pitch of the distance between internal chambers P1: 6 D1
diameter of distribution zone IV: 18 D1
diameter of outlet end of mixing zone III: 2 D1
angle α: 9°
distance H1: 10 D1
distance H2: 5 D1
distance H3: 6 D1
diameter of jet breaker: 2.5 D1
distance H4: D1
perforated plate 1 with degree of opening: 30%
ratio $\Omega s/\Omega r$ of the sum of the outlet section of the mixing zone III to the inlet section of the catalytic zone: equal to 0.5.

The velocities and compositions of the gases were simulated by applying fluid mechanics software with the commercial name FLUENT.

In case A (prior art), a device was used in accordance with the preceding dimensions, but without the perforated plate 1 and without a jet breaker.

In case B (in accordance with the invention), the perforated plate 1 with a degree of opening of 30% and a jet breaker 3 positioned at a distance H4 from the outlet section for the zone III equal to D2/5 were added.

Figure 3A:
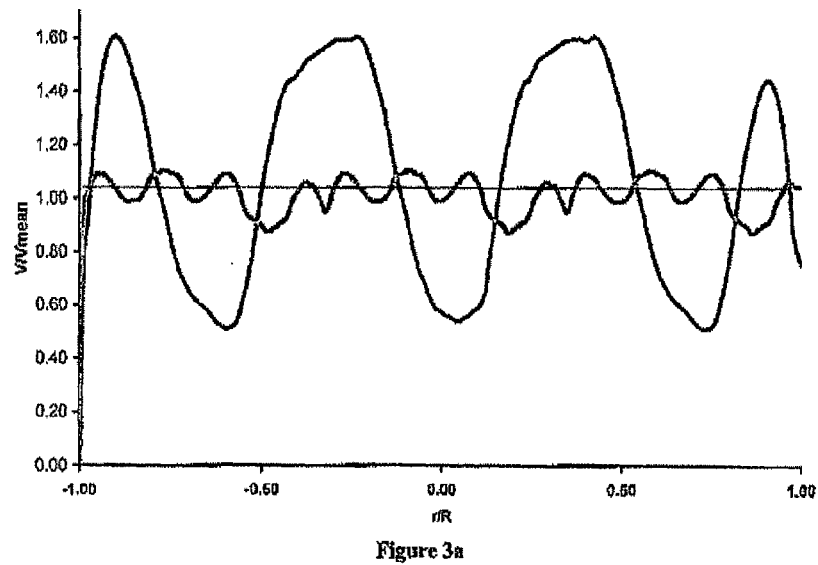
FIGS. 3a and 3b show images of the flow of gas obtained by simulation which highlight the fields of velocities and the quality of the distribution at the inlet to the catalytic zone with and without the device of the invention.

FIG. 3a compares the profile of the mean velocities calculated as a function of the reactor diameter taken at the inlet to the catalytic zone, i.e. over the outlet section from the distribution chamber IV, in case A and in case B.

The abscissa shows the ratio of the regular radius r to the radius R of the reactor.

Case A corresponds to a lack of symmetry of the fields of velocities which is particularly visible at the inlet to the enlarged zone III where the velocity vector deviates with respect to the vertical axis.

Case B, in contrast, shows excellent symmetry of the velocity vectors which are well distributed over the whole of the inlet section of the enlarged zone III and of the distribution zone IV.

Figure 3B:
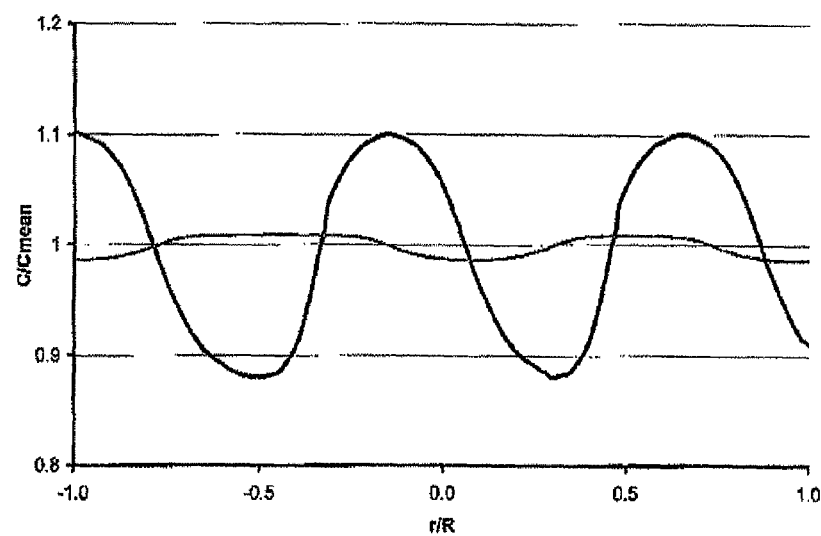

FIG. 3b compares the concentration fields in case A and case B.

The ordinate shows the ratio of the concentration of fuel at radius r over the mean concentration at the inlet to the catalytic zone as a function of the ratio of the regular radius r over the radius R of the reactor for case A (grey line) and case B (black line).

The abscissa shows the ratio of the regular radius r to the radius R of the reactor.

In case A (prior art), a lack of symmetry of the fields of concentration is observed which extends throughout the enlarged zone III and the distribution zone IV. This illustrates the importance of producing velocity fields that are as uniform as possible as soon as the gases are brought into contact at the inlet to the enlarged zone III.

In case B (in accordance with the invention), the symmetry of the concentration fields is, in contrast, very good as soon as the reagents are brought into contact, and is maintained both in the mixing zone III and in the distribution zone IV.

French Patent Application No. 89/03.588 filed Jul. 21, 2009 is incorporated in its entirety by reference.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A mixing and distributing device for a first gas and a second gas located upstream of a catalytic zone having an inlet section $\Omega r$, said device comprising:
a plurality of internal chambers (I) each with a diameter D1, an external chamber (II) with a diameter D2 enveloping the plurality of internal chambers (I), the density of internal chambers (I) being in the range 10 to 500 per m² of the external chamber (II), each internal chamber (I) having an enlarged lower (III) zone terminating in an outlet section $\Omega s$, each internal chamber (I) being provided with an inlet pipe (E1), and the external chamber (II) being provided with an inlet pipe (E2) and a perforated plate having orifices, the perforated plate (1) positioned at a lower distance H2 in the range 20 mm to 300 mm with respect to the inlet pipe (E2), and with a pitch between the orifices in the perforated plate (1) being in the range of D'/3 to D'/10, wherein D' is defined as the difference between the pitch of the distance separating the internal chambers (I) and the diameter D1 of each internal chamber (I), the external chamber (II) communicating with each of the internal chambers (I) via a series of orifices (2) pierced in the wall of each internal chamber (I) in a zone located at a distance H1 with respect to the inlet pipe (E2), H1 being substantially equal to twice H2; and the angle ($\alpha$) of the walls of the enlarged lower zone (III) with respect to vertical being in the range 5° to 45°; and wherein the sum of the outlet sections $\Omega s$ of the internal chambers (I) is less than the inlet section of the catalytic zone $\Omega r$, in which case the device further comprises a distribution chamber (IV) interposed between the outlet sections $\Omega s$ and the inlet section $\Omega r$ of the catalytic zone, said distribution chamber (IV) having a height H3 in the range of 2 (D1) to 50 (D1), and when the sum of the outlet sections $\Omega s$ of the internal chambers (I) is less than the inlet section of the reaction zone $\Omega r$, the distribution zone (IV) contains a jet breaker positioned at a height H4 below the outlet section $\Omega s$ of each internal chamber (I) such that H4 is in the range (D1)/4 to 2 (D1).

2. The mixing and distributing device according to claim 1, in which the perforated plate (1) provided in the external chamber (II) has a degree of opening in the range 5% to 50%.

3. The mixing and distributing device according to claim 1, in which the density of the internal chambers (I) is in the range 20 to 100 per $m^2$ of section of the external chamber (II).

4. A reactor for autothermal steam reforming of a hydrocarbon cut containing a range of 1 to 20 carbon atoms, said reactor comprising a mixing and distributing device according to claim 1.

5. The mixing and distributing device of claim 1, wherein the distance H2 is in the range of 50 mm to 150 mm.

6. The mixing and distributing device of claim 1, wherein the angle (a) of the walls of the enlarged lower zone (III) with respect to the vertical is in the range of 7° to 25°.

7. The mixing and distributing device of claim 2, wherein the perforated plate (1) has a degree of opening in the range of 10% to 30%.

8. A reactor for autothermal steam reforming of a fuel gas comprising a mixture of hydrocarbon and steam and an oxidant gas comprising a mixture of air and steam, said reactor comprising the mixing and distributing device of claim 1.

* * * * *

UNITED STATES PATENT AND TRADEMARK OFFICE
CERTIFICATE OF CORRECTION

PATENT NO.        : 8,475,728 B2
APPLICATION NO.   : 12/839472
DATED             : July 2, 2013
INVENTOR(S)       : Christophe Boyer et al.

Page 1 of 1

It is certified that error appears in the above-identified patent and that said Letters Patent is hereby corrected as shown below:

Title Page, After "Prior Publication Data" add the following:

Item --[30] Foreign Application Priority Data

July 21, 2009 (FR).....................09/03.588--

Signed and Sealed this
Twenty-fourth Day of September, 2013

Teresa Stanek Rea
*Deputy Director of the United States Patent and Trademark Office*